Dec. 25, 1956          T. G. HARE          2,775,381
ATTACHING AND SUPPORTING MEANS FOR
AUTOMOBILE LUGGAGE CARRIER

Original Filed Nov. 6, 1951          2 Sheets-Sheet 1

INVENTOR.
TERENCE G. HARE
BY
ATTORNEYS.

Dec. 25, 1956   T. G. HARE   2,775,381
ATTACHING AND SUPPORTING MEANS FOR
AUTOMOBILE LUGGAGE CARRIER
Original Filed Nov. 6, 1951   2 Sheets-Sheet 2

INVENTOR.
TERENCE G. HARE
BY
Barnes Kisselle Laughlin Raisch
ATTORNEYS.

United States Patent Office 2,775,381
Patented Dec. 25, 1956

2,775,381

ATTACHING AND SUPPORTING MEANS FOR AUTOMOBILE LUGGAGE CARRIER

Terence G. Hare, Detroit, Mich., assignor to Miller Manufacturing Co., Detroit, Mich., a corporation of Michigan Original application November 6, 1951, Serial No. 255,055, now Patent No. 2,643,040, dated June 23, 1953. Divided and this application May 6, 1953, Serial No. 353,346

1 Claim. (Cl. 224—42.1)

This invention relates to carrier means for carrying material on and above the top portions of automotive vehicles, and particularly passenger automobiles.

This application is a division of application Serial No. 255,055 filed November 6, 1951, now Patent No. 2,643,040 granted June 23, 1953.

The invention is concerned particularly with improvements in the attaching means and in the load supporting means which transfers the load to the vehicle construction. When the device is referred as a luggage carrier, it is to be appreciated that the term "luggage" is used in a very broad manner to cover any sort of material or object or objects which one desires to transport.

An object of the invention is to provide improved means for the attachment of the luggage carrier to the vehicle to support the load of the luggage carrier and for providing a positive acting lock for securing the carrier to structure of the automobile body.

A carrier structure made in accordance with the invention is shown in the accompanying drawings and some parts of the automotive vehicle are shown.

Figure 1:
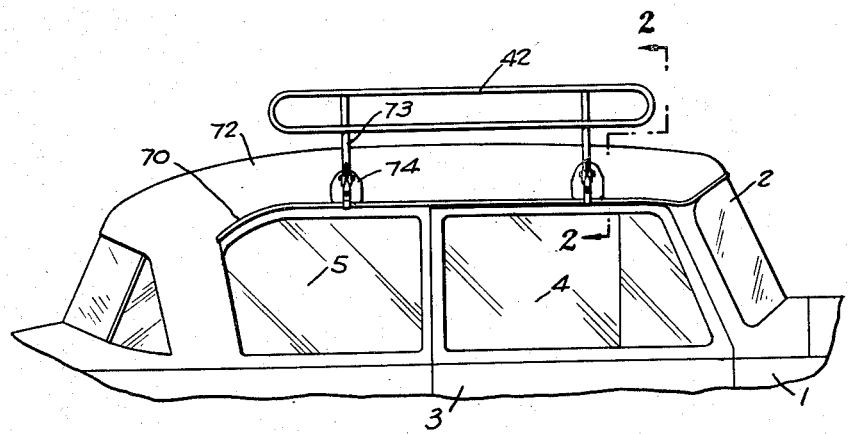
Fig. 1 is a side elevational view of a portion of an automobile illustrating a carrier of the present invention.

The vehicle, as shown in Fig. 1, has a body generally illustrated at 1, a windshield 2, a door 3, with a window 4, and a window 5 positioned to the rear of the door.

Figure 2:
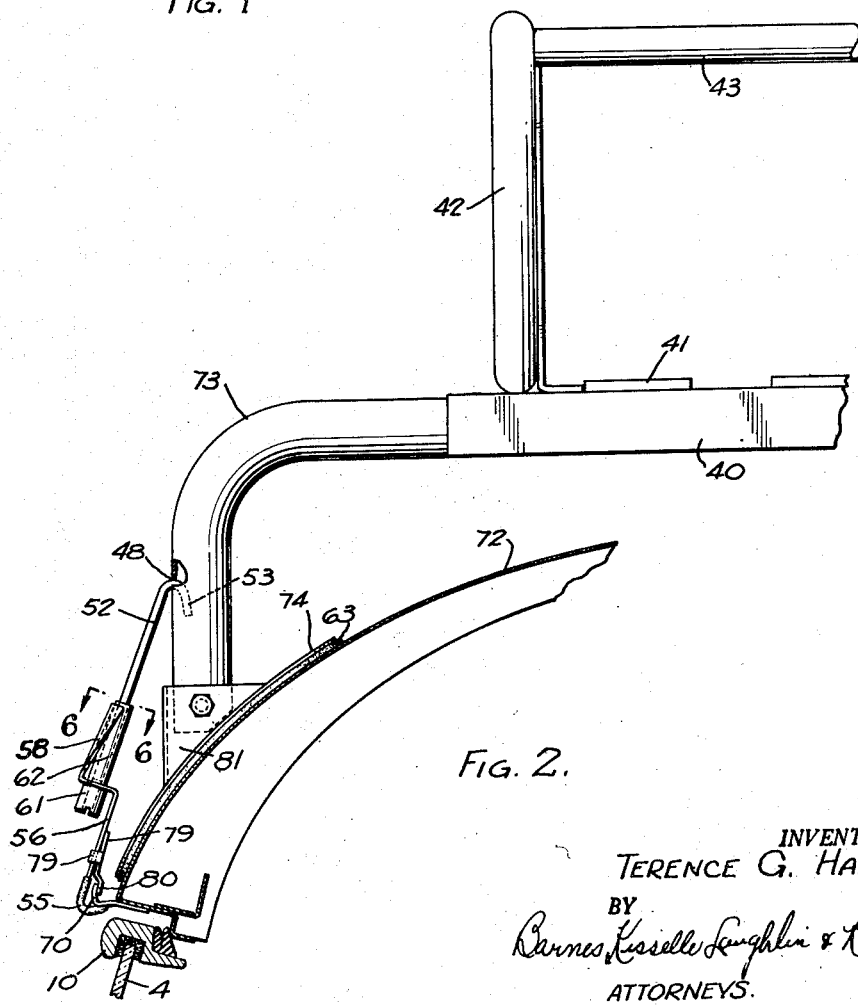
Fig. 2 is an enlarged cross sectional view taken substantially on line 2—2 of Fig. 1 showing some of the structural features of the carrier and also of the vehicle.

The top or roof of the vehicle is illustrated at 72 and it is shown as being of the conventional sheet metal permanent type. The top has a drip trough 70. In some vehicle constructions the drip trough is of proportions such that it is difficult to have a hook remain engaged therewith. The drip trough 70 as shown in Fig. 2 is an example. As shown in Fig. 2 the door is provided with a frame 10 for the window 4.

The carrier embodies transverse frame members 40 which have longitudinal extending slats 41 and slide elements 42 with reinforcing cross members 43. Each cross member 40 which may be of tubular construction, may receive telescopically a leg 73 which bends downwardly, as shown in Fig. 2. The carrier leg 73, as shown, is provided with a pad or saddle 74 for resting on the roof of the car and the load of the carrier and its contents is supported in this manner. Usually, there are four of such pads, two on each side, as indicated in Fig. 1.

Figure 4:
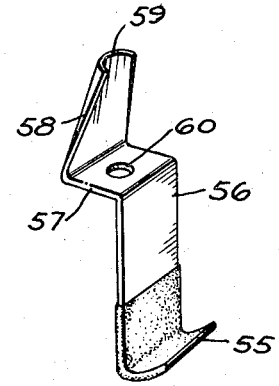
Fig. 4 is a view of the hold-down hook.
Figure 6:
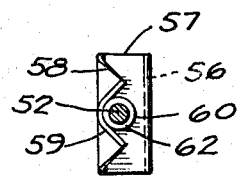
Fig. 6 is a view partly in section taken on line 6—6 of Fig. 2.

To hold the carrier in position, there is a screw threaded anchor rod 52 with a hook 53 received in the aperture 48. There is also an eave hook member, as shown in Fig. 4, having a lower hook portion 55 for engaging under the drip trough as shown in Fig. 2. This hook portion as shown, is preferably covered with rubber or plastic so that it does not mar the finish. This hook member has an upstanding body portion 56, a laterally extending offset 57 and an upstanding upper end 58 fashioned to provide a concavity 59. The offset portion 57 has an aperture 60 therein.

There is a barrel nut, having a head portion 61 and a barrel portion 62. The nut is passed through the aperture 60 so that its head underlies the offset 57 with the upper end of its barrel portion fitting into and journalled in the concavity 59. The threaded end of the anchor rod is engaged in the nut and by turning the nut the assembly is tightened with hook 55 engaging under the drip trough and the pad 74 pulled down and seated upon the top portion 72 of the body. It is easy to mount the carrier in this manner and to remove the carrier. In such removal it is only necessary to loosen the barrel nuts sufficiently to disengage the hooks from underneath the eave troughs and then the carrier structure may be lifted off.

Figure 5:
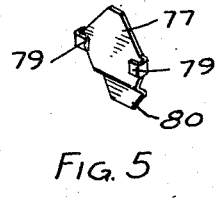
Fig. 5 is an elevational view of a lock member.
Figure 7:
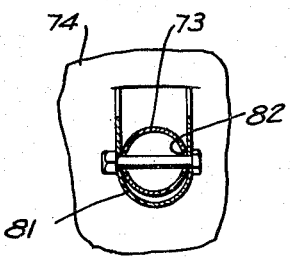
Fig. 7 is a sectional view taken substantially on line 7—7 of Fig. 3.

A lock member 77 as shown in Fig. 5 is arranged on one side of the portion 56 of the hold-down hook and it has a pair of fingers or tangs 79 fashioned around on the opposite sides of the hold-down hook so that the locking member is slidable thereon. The locking member has a finger 80 for engaging within the drip trough 70 as shown in Fig. 2. The locking member may be engaged or released by shifting the same slidably on the eave hook.

Figure 3:
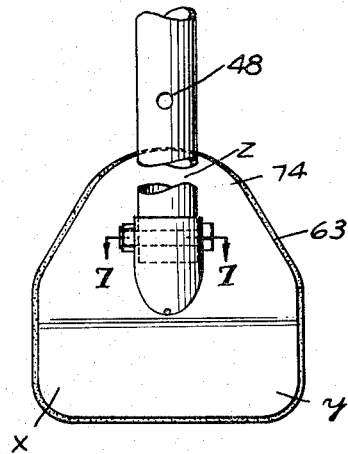
Fig. 3 is an elevational view showing a supporting foot and attachment to the supporting member.

The shoe 74 has a curve somewhat as shown in Fig. 2 generally to follow the contour of the top 72 and its general contour is shown in Fig. 3.

This contour is somewhat of a three-sided or triangular shape so that it has three areas of contact generally indicated at $x$, $y$ and $z$. The body of the shoe which may be fashioned from sheet metal is formed with an upstanding hollow projection 81 for receiving the end of the leg 73 (Fig. 3). A bolt is passed through apertures in the hollow portion 81 and through relatively enlarged apertures 82 in the leg. Thus, the shoe may rock on the bolt and the bolt may shift or rock in the enlarged apertures 82 relative to the leg 73 and, accordingly, the shoe 74 is connected to the leg 73 in the manner so that it has a limited amount of universal movement. Thus the shoe 74 may oscillate relative to the leg 73 and adjust itself to contact with the top 72. Preferably, the shoe has an inner facing of plastic or rubber 83 so as to not mar the surface of the top and due to its universal mounting and its three points of contact $x$, $y$ and $z$, it adapts itself to the compound curvatures usually found in the top 12 of automotive vehicles. The shape and curvature of the tops of various vehicles vary but the universal mounting and the three-point contact principle provides for the shoe making good stable contact with most any model or make of automotive vehicle.

I claim:

Means for securing a luggage carrier to the top of an automobile, which luggage carrier has a load supporting member for resting upon the top portion of the automobile comprising, a hook member of relatively wide metal stock for engaging under a drip trough of the automobile body, means connecting the hook member to the load supporting member, a lock member having a body part disposed against a flat face of the hook member and having tangs on opposite edges thereof fashioned loosely and slidably about the opposite edges of the hook member for slidably mounting the lock member on the hook member, said lock member having a projecting and offset finger at its lower edge, the lock member being slidable into a position with said finger projecting within the drip trough to engage an inner surface thereof and thereby hold the hook member in engagement with the under side of the drip trough.

References Cited in the file of this patent

UNITED STATES PATENTS

| | | |
|---|---|---|
| 2,268,958 | Parten et al. | Jan. 6, 1942 |
| 2,450,090 | Hunt | Sept. 28, 1948 |
| 2,480,353 | Bjork | Aug. 30, 1949 |
| 2,596,860 | McCrory et al. | May 13, 1952 |
| 2,610,085 | Zeeb | Sept. 9, 1952 |
| 2,624,497 | Newman | Jan. 6, 1953 |
| 2,663,472 | Belgau | Dec. 22, 1953 |